US008650256B2

(12) United States Patent
Chakra et al.

(10) Patent No.: US 8,650,256 B2
(45) Date of Patent: Feb. 11, 2014

(54) COMMUNICATIONS SECURITY BY ENFORCING OFFLINE CONSUMPTION AND AUTO-TERMINATION OF ELECTRONIC MESSAGES

(75) Inventors: Al Chakra, Apex, NC (US); Liam Harpur, Dublin (IE); Michelle Purcell, Tullamore (GB); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/271,673

(22) Filed: Oct. 12, 2011

(65) Prior Publication Data

US 2013/0097248 A1 Apr. 18, 2013

(51) Int. Cl.
*G06F 15/16* (2006.01)
(52) U.S. Cl.
USPC ........... 709/206; 709/203; 709/207; 709/217; 709/219; 726/1; 726/2; 726/3; 726/16; 726/28; 726/31
(58) Field of Classification Search
USPC .......... 709/203, 206, 207, 217, 219; 726/1, 2, 726/3, 16, 26, 28, 31
See application file for complete search history.

(56) References Cited

U.S. PATENT DOCUMENTS

| 6,324,569 | B1 * | 11/2001 | Ogilvie et al. | 709/206 |
|---|---|---|---|---|
| 6,442,600 | B1 * | 8/2002 | Anderson | 709/217 |
| 7,466,987 | B2 * | 12/2008 | Kinnunen et al. | 455/456.3 |
| 7,558,824 | B2 * | 7/2009 | Silver et al. | 709/206 |
| 7,783,715 | B2 * | 8/2010 | Muller | 709/206 |
| 8,196,183 | B2 * | 6/2012 | Smith et al. | 726/4 |
| 8,275,841 | B2 * | 9/2012 | Heinla et al. | 709/206 |
| 8,290,476 | B2 * | 10/2012 | Jagetiya | 455/412.1 |
| 8,307,029 | B2 * | 11/2012 | Davis et al. | 709/203 |
| 8,316,233 | B2 * | 11/2012 | Errico | 713/165 |
| 8,428,634 | B2 * | 4/2013 | Schwagmann et al. | 455/518 |

(Continued)

FOREIGN PATENT DOCUMENTS

| CN | 102129650 A | * | 7/2011 | | G06Q 40/00 |
| EP | 1111883 | * | 6/2010 | | H04Q 7/20 |
| WO | WO 2009098059 A2 | * | 8/2009 | | H01L 1/00 |

OTHER PUBLICATIONS

Gaurav et al., Proceedings of the 1st International Conference on Intelligent Interactive Technologies and Multimedia, IITM 2010, Dec. 1, 2010.*

*Primary Examiner* — Abdullahi Salad
*Assistant Examiner* — Jimmy H Tran
(74) *Attorney, Agent, or Firm* — Patents on Demand P.A.; Brian K. Buchheit; Scott M. Garrett

(57) ABSTRACT

A restrictive presentation system can receive an electronic message configured for offline consumption expressed as user-specified delivery conditions. The electronic message can be securely conveyed to a computing device in an online state using a communications network. A client application of the restrictive presentation system can be installed upon the computing device and can receive the electronic message. The client application can detect a change of the computing device from the online state to the offline state. In response to user-acceptance, the electronic message can be presented upon the computing device while in the offline state. Upon user-termination of the presentation, the electronic message can be automatically deleted from a storage location of the computing device. When the computing device returns to the online state, the client application can notify the restrictive presentation system of the offline consumption.

20 Claims, 4 Drawing Sheets

(56) References Cited

U.S. PATENT DOCUMENTS

| | | | |
|---|---|---|---|
| 2001/0021649 A1* | 9/2001 | Kinnunen et al. | 455/412 |
| 2002/0032742 A1* | 3/2002 | Anderson | 709/206 |
| 2002/0184256 A1* | 12/2002 | Reich et al. | 707/500 |
| 2002/0194501 A1* | 12/2002 | Wenocur et al. | 713/201 |
| 2004/0193915 A1* | 9/2004 | Smith et al. | 713/200 |
| 2006/0031334 A1* | 2/2006 | Kim | 709/206 |
| 2006/0048224 A1* | 3/2006 | Duncan et al. | 726/22 |
| 2007/0143700 A1* | 6/2007 | Fukada | 715/768 |
| 2007/0232274 A1* | 10/2007 | Jung et al. | 455/412.1 |
| 2008/0086431 A1* | 4/2008 | Robinson et al. | 706/11 |
| 2008/0270547 A1* | 10/2008 | Glickstien et al. | 709/206 |
| 2008/0313296 A1* | 12/2008 | Muller | 709/206 |
| 2009/0150489 A1* | 6/2009 | Davis et al. | 709/204 |
| 2010/0198915 A1* | 8/2010 | Mashita et al. | 709/203 |
| 2011/0113367 A1* | 5/2011 | Carter et al. | 715/808 |
| 2011/0213845 A1* | 9/2011 | Logan et al. | 709/206 |
| 2012/0149406 A1* | 6/2012 | Park et al. | 455/466 |

* cited by examiner

COMMUNICATIONS SECURITY BY ENFORCING OFFLINE CONSUMPTION AND AUTO-TERMINATION OF ELECTRONIC MESSAGES

BACKGROUND

The present invention relates to the field of electronic communications and, more particularly, to improving communications security by enforcing offline consumptions and auto-termination of electronic messages.

The use of electronic messages (e.g., emails, instant messages, text messages, etc.) for communication has become a key part of many aspects of daily life—home, office, social, and community. As with any type of communications, keeping an electronic message private between two parties is a challenge. While many communications systems utilize the latest in encryption and/or security protocols to protect the message while in transit, many communications systems lack the ability for the sender to prevent a recipient from re-transmitting the message. For example, an executive would not want a manager to forward or leak an email listing employees who are on a list of upcoming lay-offs.

A variety of organizational-level techniques exist for limiting the distribution of sensitive information in the form of electronic messages. For example, government agencies have segregated communications systems—one communications system for general communications and a separate communications system for sensitive information. This approach incurs the cost of running two separate communications systems and still relies upon the individual user to not take additional measures to redistribute information.

A small organization, public, or commercial communications system typically cannot afford such overhead and tends to rely solely on user discretion. These communications systems lack the ability to restrict the handling of electronic messages by recipients to prevent retransmission.

BRIEF SUMMARY

One aspect of the present invention can include a method for securing message consumption. Such a method can begin when a restrictive presentation system receives an electronic message configured for offline consumption. Offline consumption can be expressed as user-specified delivery conditions associated with the electronic message. The electronic message can then be securely conveyed by the restrictive presentation system to a computing device of a recipient of the electronic message using a communications network. The computing device can be in an online state that allows data exchanges with the restrictive presentation system. A client application of the restrictive presentation system can be installed upon the computing device and can receive the electronic message from the restrictive presentation system. The client application can detect a change of the computing device from the online state to the offline state. In response to user-acceptance, the electronic message can be presented by the client application upon the computing device while the computing device is in the offline state. Upon user-termination of the presentation of the electronic message, the electronic message can be automatically deleted from a storage location of the computing device. When the computing device returns to the online state, the client application can notify the restrictive presentation system of the offline consumption of the electronic message.

Another aspect of the present invention can include a system for securing message consumption. Such a system can include electronic messages, a communications system, and a restrictive presentation system. The electronic messages can be configured for offline consumption using at least one user-specified delivery condition. The communications system can be configured to facilitate an exchange of the electronic messages between computing devices over a communications network. The restrictive presentation system can be configured to restrict presentation of the electronic messages upon a computing device of the designated recipients to a point in time when the computing device is in an offline state. When in the offline state, the computing device can be disconnected from the communications network and only a view operation can be allowed to be performed upon the electronic message. The electronic message can be automatically erased from the computing device once viewing is complete.

Yet another aspect of the present invention can include a computer program product that includes a computer readable storage medium having embedded computer usable program code. The computer usable program code configured to receive an electronic message configured for offline consumption upon a computing device. The configuration for offline consumption can be expressed as user-specified delivery conditions associated with the electronic message. The computer usable program code can be configured to determine an auto-termination time limit for the electronic message. The auto-termination time limit can define a maximum amount of time the electronic message is to be stored upon the computing device without being presented for offline consumption. Then, the computer usable program code can be configured to periodically assess satisfaction of the delivery conditions of the electronic message and the auto-termination time limit. When the delivery conditions are satisfied prior to reaching the auto-termination time limit, the computer usable program code can be configured to ascertain a communications state of the computing device. The communications state can include an online state and an offline state, representing the ability or inability of the computing device to exchange data over a communications network, respectively. The computer usable program code can then be configured to, when the communications state of the computing device is the offline state, present the electronic message within a user interface upon the computing device. The capabilities of the user interface and computing device can be restricted to a view capability. Upon user-termination of the presentation of the electronic message, the computer usable program code configured to automatically delete the electronic message from a secured storage location local to the computing device.

DETAILED DESCRIPTION

Figure 1:
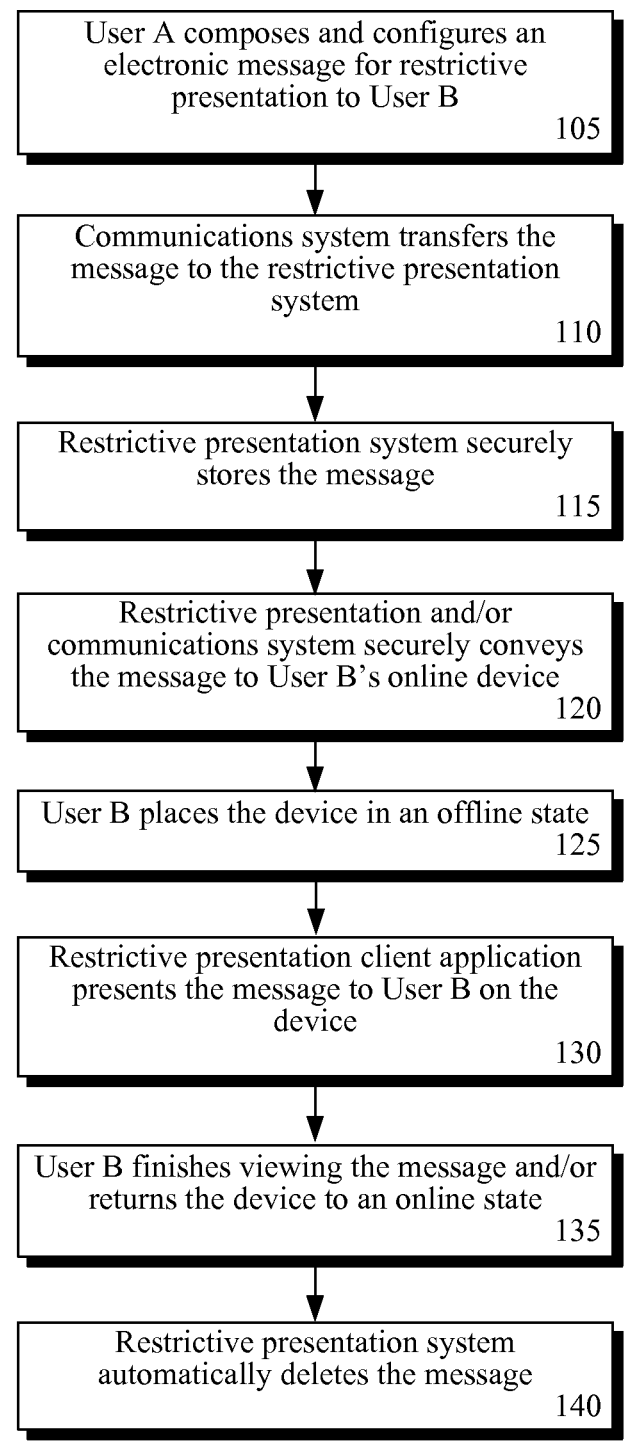
FIG. 1 is a flow chart of a method describing the basic functionality provided by a restrictive presentation system for electronic messages in accordance with embodiments of the inventive arrangements disclosed herein.

The present invention discloses a client-server solution for securing electronic message consumption by requiring the presenting device to be in an offline or non-communicative state. Once the electronic message has been viewed upon the device, the electronic message can then be deleted from the computing device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flow chart of a method 100 describing the basic functionality provided by a restrictive presentation system for electronic messages in accordance with embodiments of the inventive arrangements disclosed herein. Method 100 can express the functionality of the restrictive presentation system in terms of electronic messaging between two users—User A and User B.

Method 100 can begin in step 105 where User A can compose and configure an electronic message, herein referred to as a message, for restrictive presentation to User B. The composition and/or configuration of the message performed in step 105 can be performed using a user interface of an appropriate communications system (e.g., email system, instant messaging system, etc.) that allows for restrictive presentation configuration.

The communications system can transfer the message to the restrictive presentation system in step 110. In step 115, the restrictive presentation system can securely store the received message. The restrictive presentation system and/or communications system can securely convey the message to a computing device of User B's that is online in step 120.

As used herein, the terms "online" and "offline" are used to refer to the communications state of a computing device, such that communication is enabled when in the online state and disabled when in the offline state. Thus, the computing device can be unable to send or receive data and/or electronic messages with other computing devices using a communications network while in the offline state.

In step 125, User B can place the computing device in an offline state. The computing device can be placed in the offline state physically by the disabling of the computing device's transceiver or connection cable or virtually by a function of the restrictive presentation system that blocks message traffic to and from the computing device's communication ports.

Once the computing device is in the offline state, the client application of the restrictive presentation system can present the message to User B on the computing device in step 130. In step 135, User B can finish viewing the message and/or return the computing device to an online state. The restrictive presentation system can then automatically delete the message in step 140.

Thus, the restrictive presentation system can provide two key functions to increase the security of an electronic message—requiring the computing device upon which the message is to be presented upon to be in an offline state and automatically deleting the message once it has been viewed. Since the computing device is in an offline state while the message is being viewed, the user cannot transmit the message.

Further, step 130 can be expanded to limit the operations that User B is able to perform while viewing the message. For example, the client application of the restrictive presentation system can disable all other menu operations of the user interface to ensure that User B does not save a copy of the message or copies the text of the message.

It should be noted that these key functions can be in addition to security features used by communications systems, such as message encryption and use of secure communication channels.

Figure 2:
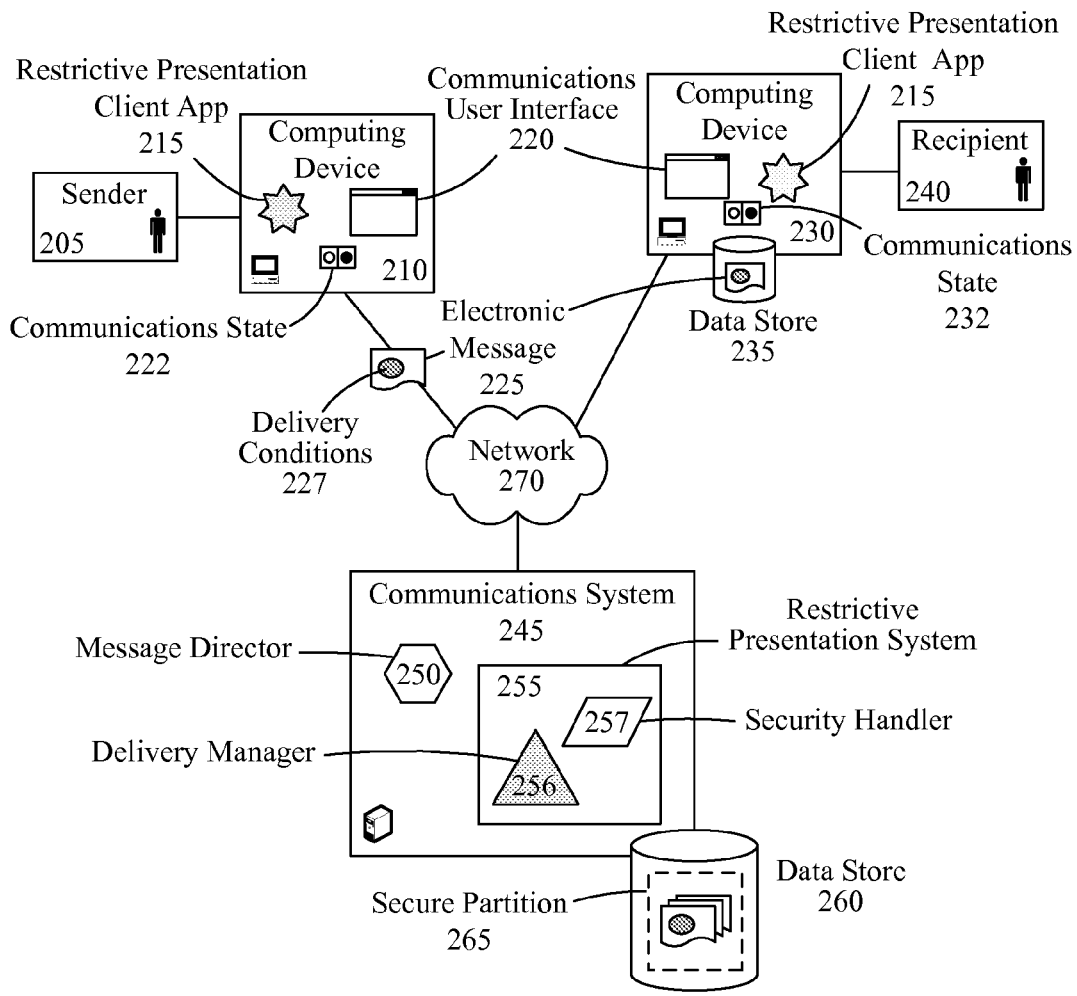
FIG. 2 is a schematic diagram illustrating a system that utilizes a restrictive presentation system to secure an electronic message between a sender and a recipient in accordance with an embodiment of the inventive arrangements disclosed herein.

FIG. 2 is a schematic diagram illustrating a system 200 that utilizes a restrictive presentation system 255 to secure an electronic message 225 between a sender 205 and a recipient 240 in accordance with embodiments of the inventive arrangements disclosed herein. System 200 can perform the steps of method 100.

In system 200, the sender 205 can create an electronic message 225 using the communications user interface 220 of the communications system 245. The electronic message 225 can be a digital container for user-entered data of a format commensurate with the formats supported by the communications system 245 (i.e., an email 225 handled by an email system 245).

One or more delivery conditions 227 of the electronic message 225 can be configured by the sender 205 to indicate that the electronic message 225 requires offline consumption on the part of the recipient 240. The delivery conditions 227 can represent a variety of parameters that can be configured by the sender 205 of the electronic message 225.

For example, the communications user interface 220 can include a selectable drop-down menu that includes the value "restricted viewing" to designate that the electronic message 225 is to be viewed offline. The delivery conditions 227 can also include other delivery-related parameters, such as those for specifying the delayed delivery of the electronic message 225.

The communications system 245 can represent the hardware and/or software components necessary to handle the conveyance of electronic messages 225 between computing devices 210 and 230 over a network 270. Communications systems 245 are well known in the art, and, therefore, details relating to specific components and/or functionalities need not be discussed herein.

It should be notes, however, that the communications system 245 can include a variety of components not shown in system 100, and whose operation are not influential to this embodiment of the present disclosure; only those components involved with this embodiment of the present disclosure shall be discussed in relation to system 200.

The communications system 245 can include the communications user interface 220, a message director 250, the restrictive presentation system 255, and a data store 260. The communications user interface 220 can be a graphical user interface operating upon the computing devices 210 and 230 of users that allows the sender 205 and recipient 240 to execute functions of the communications system 245 (i.e., create and view electronic messages 225).

The message director 250 can be a component of the communications system 245 configured to handle delivery of electronic messages 225. That is, the message director 250 can direct an incoming electronic message 225 to the appropriate recipient 240 and/or intermediary handler, such as the restrictive presentation system 255.

The restrictive presentation system 255 can represent the hardware and/or software components required to support offline viewing and the automatic destruction of electronic messages 225 by a recipient 240. The restrictive presentation system 255 can utilize a client-server architecture, requiring the installation of the restrictive presentation client application 215 upon computing devices 210 and 230 in order to receive electronic messages 225 from the restrictive presentation system 255.

As shown in system 200, the server component of the restrictive presentation system 255 can be an element or subsystem of the communications system 245. In another embodiment, the server component of the restrictive presentation system 255 can reside upon a separate server (not shown) that communicates with the communications system 245 and/or computing device 230 of the recipient 240 over the network 270.

Upon receipt of an electronic message 225 that is configured for offline consumption, the message director 250 of the communications system 245 can pass the electronic message 225 to the server component of the restrictive presentation system 255. The server component of the restrictive presentation system 255 can include a delivery manager 256 and a security handler 257.

The delivery manager 256 can be the component of the restrictive presentation system 255 that delivers the electronic message 225 to the restrictive presentation client application 215 operating on the computing device 230 of the recipient 240. The delivery manager 256 can be responsible for identifying one or more computing devices 230 associated with the recipient 240 that are available or in an online communications state 232. This determination can be made utilizing functionality provided by the communications system 245, such as presence and user profiles (not shown).

The communications state 232 of a computing device 210 or 230 can toggle between the online state and the offline state, which, as previously discussed, indicate the ability of the computing device 210 or 230 to send/receive data over the network 270.

It should be noted that the communications state 232 of a computing device 210 and 230 shown in system 200 can be used to visually represent this abstract concept. That is, a computing device 210 and 230 does not contain a physical component that represents its communications state 232; its communications state 232 can be ascertained through the evaluation of various environmental variables.

Should a computing device 230 for the recipient 240 be unavailable for delivery, the delivery manager 256 can store the electronic message 225 in a secure partition 265 of the data store 260. The secure partition 265 can be a portion of the data store 260 made secure using a variety of standard methodologies supported by the data store 260 and/or restrictive presentation system 255.

In another contemplated embodiment, the secure partition 265 can correspond to another data store (not shown), separate from data store 260, which is accessible by only the restrictive presentation system 255. In such an embodiment, steps can be taken to secure the entirety of the data store.

The delivery manager 256 can then monitor the communications system 245 and/or network 270 to detect when a computing device 230 of the recipient 240 enters the online communications state 232. At such a time, the delivery manager 256 can retrieve the electronic message 225 from the secure partition 265 and convey the electronic message 225 to the computing device 230.

The secure delivery of the electronic message 225 provided by the delivery manager 256 can utilize functions of the security handler 257. The security handler 257 can be a component of the restrictive presentation system 255 that performs various security-related operations.

For example, the security handler 257 can be responsible for encrypting the electronic message 225 prior to transmission over the network 270. The security handler 257 can also interact with corresponding components of the communications system 245 to establish a secure communication channel using the network 270 to the computing device 230.

Additionally, the security handler 257 can be configured to remove electronic messages 225 from the secure partition 265 should the electronic messages 225 be undeliverable for a predetermined amount of time or were viewed by the recipient 240.

This predetermined amount of time can be referred to as a delivery limit and can be a configurable delivery condition 227 of the electronic message 225. This feature can implement an automatic clean-up of space in the secure partition 265 and can allow the sender 205 to indicate a level of time-sensitivity for the electronic message 225. In cases where the electronic message 225 was undeliverable, the security handler 257 can be further configured to inform the sender 205 of the delivery failure.

For example, the sender 205 can send an electronic message 225 containing a price quote and indicate that the electronic message 225 should be delivered within two hours. Should a computing device 230 of the recipient 240 not enter the online communications state 232 within those two hours, the security handler 257 can automatically delete the electronic message 225.

The client component of the restrictive presentation system 255 can be represented by the restrictive presentation client application 215. The restrictive presentation client application 215 can be a software application installed upon the computing device 230 of the recipient 240. It should be noted that the restrictive presentation client application 215 can also be installed upon the computing device 210 of the sender 205, as shown in system 200; however, the restrictive presentation client application 215 can be required for viewing the electronic message 225 and may not be required for creation.

Figure 2A:
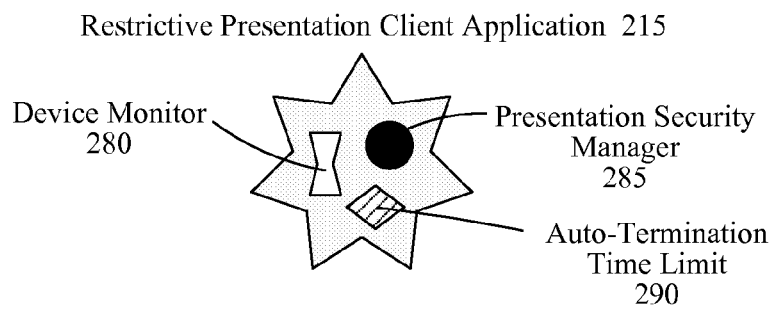
FIG. 2A is a blow-out showing the elements comprising the restrictive presentation client application.

The restrictive presentation client application 215 can be configured to receive the electronic message 225 from the server component of the restrictive presentation system 255. As shown in diagram 275 of FIG. 2A, the restrictive presentation client application 215 can include a device monitor 280, a presentation security manager 285, and an auto-termination time limit 290.

The device monitor 280 can represent the portion of the restrictive presentation client application 215 that monitors the values of environmental parameters in order to determine when the delivery conditions 227 of the electronic message 225 have been satisfied. This monitoring can include the system time of the computing device 230 for assessing satisfaction of the auto-termination time limit 290.

The auto-termination time limit 290 can define the maximum amount of time that the restrictive presentation client application 215 can store the electronic message 225 without offline consumption. That is, the auto-termination time limit 290 can represent the amount of time that the recipient 240 has to view the electronic message 225 before the restrictive presentation client application 215 deletes the electronic message 225.

Upon satisfaction of the delivery conditions 227, the device monitor 280 can be further configured to inform the recipient 240 that an electronic message 225 is waiting for offline consumption. At such a point, the recipient 240 can manually enter the offline state (i.e., remove the network cable from the computing device 230 or select commands that disable the network connection) or can opt to let the restrictive presentation client application 215 place the computing device 230 in a virtual offline state (i.e., physical connections remain, but transmissions over communications ports are blocked).

Implementation of the virtual offline state can be a function of the presentation security manager 285. The presentation security manager 285 can be the part of the restrictive presentation client application 215 that performs various functions related to the security and offline consumption of the electronic message 225.

Another function of the presentation security manager 285 can be to securely store the electronic message 225 in a data store 235 of the computing device 230. The exact method used by the presentation security manager 285 can vary based upon the specific implementation of the restrictive presentation client application 215 and/or the methods supported by the computing device 230.

For example, the presentation security manager 285 can be configured to encrypt the electronic message 225, if the electronic message 225 was not already encrypted, prior to storage.

Additionally, the presentation security manager 285 can temporarily disable functions and/or commands of the communications user interface 220 while the electronic message 225 is being presented as well as delete the electronic message 225 once viewing is complete or the auto-termination time limit 290 has been met. Thus, the recipient 240 can be restricted from interacting with the actual electronic message 225.

Network 270 can include any hardware/software/and firmware necessary to convey data encoded within carrier waves. Data can be contained within analog or digital signals and conveyed though data or voice channels. Network 270 can include local components and data pathways necessary for communications to be exchanged among computing device components and between integrated device components and peripheral devices. Network 270 can also include network equipment, such as routers, data lines, hubs, and intermediary servers which together form a data network, such as the Internet. Network 270 can also include circuit-based communication components and mobile communication components, such as telephony switches, modems, cellular communication towers, and the like. Network 270 can include line based and/or wireless communication pathways.

As used herein, presented data stores 230 and 260 can be a physical or virtual storage space configured to store digital information. Data stores 230 and 260 can be physically implemented within any type of hardware including, but not limited to, a magnetic disk, an optical disk, a semiconductor memory, a digitally encoded plastic memory, a holographic memory, or any other recording medium. Data stores 230 and 260 can be a stand-alone storage unit as well as a storage unit formed from a plurality of physical devices. Additionally, information can be stored within data stores 230 and 260 in a variety of manners. For example, information can be stored within a database structure or can be stored within one or more files of a file storage system, where each file may or may not be indexed for information searching purposes. Further, data stores 230 and/or 260 can utilize one or more encryption mechanisms to protect stored information from unauthorized access.

Figure 3:
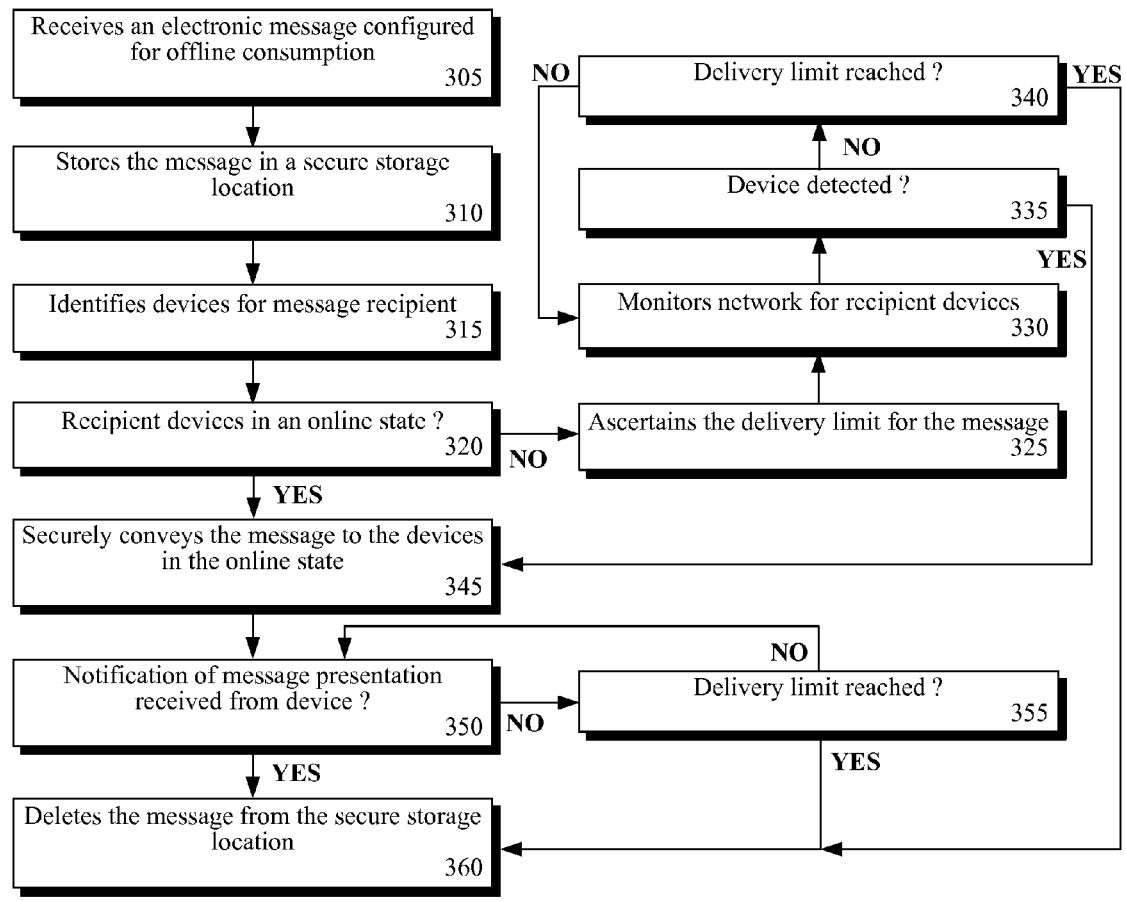
FIG. 3 is a flow chart of a method detailing the operation of the server component of the restrictive presentation system in accordance with an embodiment of the inventive arrangements disclosed herein.

FIG. 3 is a flow chart of a method 300 detailing the operation of the server component of the restrictive presentation system in accordance with embodiments of the inventive arrangements disclosed herein. Method 300 can be performed within the context of system 200, and/or in conjunction with method 100.

Method 300 can begin in step 305 where the server component of the restrictive presentation system can receive an electronic message configured for offline consumption. The message can be stored in a secure storage location in step 310.

In step 315, devices corresponding to the message's recipient can be identified. It can be determined if any of the identified recipient devices are in an online state in step 320. When none of the identified recipient devices are in the online state, step 325 can be performed where the delivery limit for the message can be ascertained. A default value for the delivery limit can be used for those messages whose sender did not specify a delivery limit.

In step 330, the network can be monitored for the identified recipient devices. The connection of an identified device can be determined in step 335. When an identified has not been detected, it can be determined in step 340 if the delivery limit has been reached. Step 340 can be performed at predetermined intervals while waiting for the detection of an identified device.

When the delivery limit has not been reached, flow can return to step 330 to continue monitoring the network for the identified recipient devices. When the delivery limit has been met, method 300 can flow to step 360 where the message can be deleted from the secure storage location.

When connection of an identified recipient device is detected in step 335 or when at least one of identified recipient devices is determined to be in the online state in step 320, step 345 can execute where the message can be securely conveyed to the devices in the online state.

The server component of the restrictive presentation system can then await the receipt of notification from the device that the message has been presented in step 350. When notification has not yet been received, satisfaction of the delivery limit for the message can be determined in step 355. Step 355 can be performed at predefined time intervals while awaiting notification from the identified devices.

When the delivery limit has not been reached, flow can return to step 350 to continue waiting for notification. When the delivery limit has been reached or when notification is received from the identified recipient device, step 360 can execute where the message can be deleted from the secure storage location.

Figure 4:
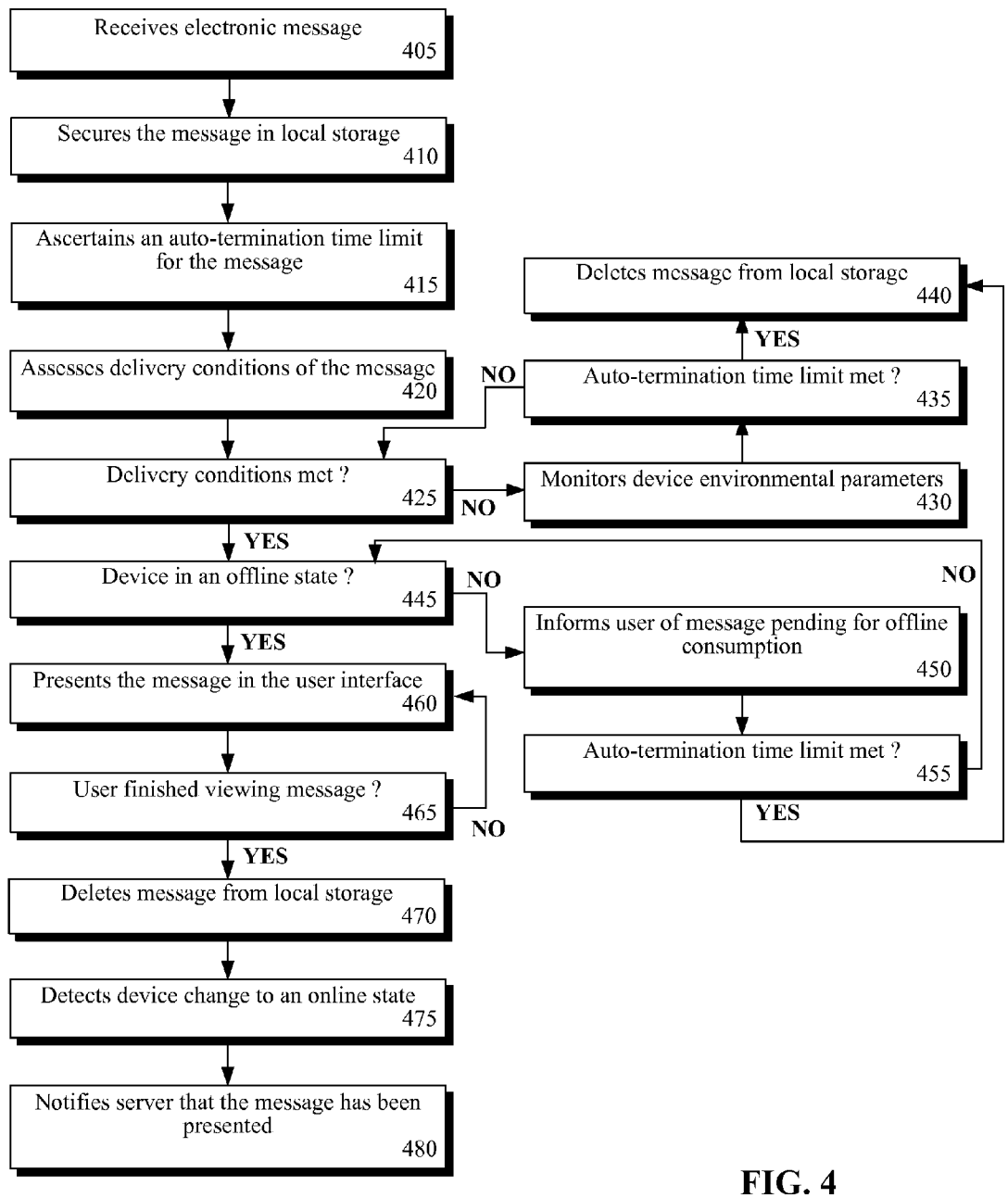
FIG. 4 is a flow chart of a method describing the operation of the client component of the restrictive presentation system in accordance with embodiments of the inventive arrangements disclosed herein.

FIG. 4 is a flow chart of a method 400 describing the operation of the client component of the restrictive presentation system in accordance with embodiments of the inventive arrangements disclosed herein. Method 400 can be performed within the context of system 200, and/or in conjunction with methods 100 and/or 300.

Method 400 can begin in step 405 where the client component of the restrictive presentation system, the restrictive presentation client application, can receive the electronic message from the server component of the restrictive presentation system. The received message can be secured in the local storage of the computing device in step 410.

In step 415, an auto-termination time limit can then be ascertained for the message. The delivery conditions of the message can be assessed in step 420. Satisfaction of the delivery conditions can be determined in step 425.

When the delivery conditions have not been satisfied, step 430 can be performed where the restrictive presentation client application can monitor the environmental parameters of the device. Satisfaction of the auto-termination time limit can be determined in step 435.

When the auto-termination time limit has not been met, flow can return to step 425 to continue the loop of assessing and monitoring the delivery conditions for the message. When the auto-termination time limit has been met, the message can be deleted from the local storage in step 440.

When the delivery conditions have been satisfied, step 445 can be performed where it can be determined if the device is currently in an offline state. When the device is not in an offline state, the user can be informed of the message pending for offline consumption in step 450.

For example, a user may keep their desktop computer in their office in an online state (i.e., always logged onto the office network). Since the user is not prone to logging off the office network of their own accord, the restrictive presentation client application can provide the notification of step 450 in order to prompt the user to place their desktop computer in an offline state.

In step 455, satisfaction of the auto-termination time limit can be determined. That is, the user can put off viewing of the message only by the amount of time left until the end of the auto-termination time limit. The restrictive presentation client application can provide a countdown timer or other means of informing the user to the amount of time remaining in which they can view the message.

When the auto-termination time limit has been satisfied, step 440 can be performed where the message can be deleted from the local storage. Step 440 can be expanded to encompass methods other than self-deletion for handling messages that have not been viewed within their auto-termination time limit, such as converting the message to a standard or unrestricted message type. The type of handling performed for unviewed messages can be a message-specific configurable parameter defined by the message's sender.

When the auto-termination time limit has not been met, flow can return to step 445 to continue the loop of waiting for the device to enter an offline state. When the device is in an offline state, the restrictive presentation client application can then present the message to the user in a user interface in step 460.

In step 465, it can be determined if the user is finished viewing the message. When the user is not finished, flow can loop back to step 460 to continue presentation of the message.

When the user is finished viewing the message, step 470 can be performed where the message can be deleted from local storage. The change of the communications state of the device to the online state can be detected in step 475. In step 480, the restrictive presentation client application can notify the server component that the message has been presented.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   receiving of an electronic message configured for offline consumption by a restrictive presentation system, wherein said offline consumption is expressed as at least one user-specified delivery condition associated with the electronic message;
   securely conveying the electronic message to at least one computing device of a recipient designated for the electronic message by the restrictive presentation system using a communications network, wherein the at least one computing device is in an online state allowing data exchanges with the restrictive presentation system, wherein a client application of the restrictive presentation system is installed upon the at least one computing device, wherein said client application receives the electronic message from the restrictive presentation system;
   detecting of a change of a computing device from the online state to an offline state by the client application;
   in response to user-acceptance, presenting of the electronic message upon the computing device while the computing device is in the offline state by the client application;
   upon user-termination of the presentation of the electronic message, automatically deleting the electronic message from a storage location of the computing device; and
   when the computing device returns to the online state, notifying the restrictive presentation system of the offline consumption of the electronic message by the client application.

2. The method of claim 1, wherein receiving of the electronic message further comprises:
   storing of the electronic message in a secure partition of a data store by the restrictive presentation system; and
   ascertaining a delivery limit from the at least one user-specified delivery condition of the electronic message, wherein the delivery limit defines a maximum time by which the electronic message is to be delivered.

3. The method of claim 2, wherein, at predetermined time intervals from receipt of the electronic message until the restrictive presentation system is able to deliver the electronic message to the client application of the at least one computing device, said method further comprises:
   determining a satisfaction of the delivery limit; and
   when the delivery limit is satisfied, deleting the electronic message from a data store of the restrictive presentation system, wherein the electronic message is stored in a secure partition of the data store.

4. The method of claim 1, wherein the secure delivery of the electronic message further comprises:
   encrypting the electronic message using a standardized encryption algorithm; and
   establishing a secure communication connection between the restrictive presentation system and the at least one computing device using at least one communications network and at least one standardized communications protocol.

5. The method of claim 1, wherein, when the client application receives the electronic message via the secure conveyance, said method further comprises:
   storing the received electronic message securely in a data store local to the computing device;
   determining an auto-termination time limit for the electronic message, wherein the auto-termination time limit defines a maximum amount of time the electronic message is to be stored upon the computing device without being presented by the client application for offline consumption;
   periodically assessing satisfaction of the at least one delivery condition of the electronic message;
   when the at least one delivery condition is satisfied prior to reaching the auto-termination time limit, informing a user of the computing device of the electronic message for offline consumption; and
   when the auto-termination time limit is reached prior to the detection of the change of the computing device to the offline state, deleting the electronic message from the local data store.

6. The method of claim 1, wherein the change of the computing device from the online state to the offline state is achieved by at least one of a virtual block of communication ports of the computing device by the client application and a physical disconnection of the computing device from the communications network, wherein, in the offline state, an ability of the computing device to exchange data over the communications network is disabled.

7. The method of claim 1, further comprising: upon receipt of notification from the client application, deleting the electronic message from a data store of the restrictive presentation system, wherein the electronic message is stored in a secure partition of the data store.

8. The method of claim 1, wherein the restrictive presentation system is a component of a communications system that provides an exchange of electronic messages between computing devices connected to the communications network.

9. The method of claim 1, wherein the electronic message comprises at least one of an email, an instant message, a text message, an audio message, and a video message.

10. A system comprising:
    one or more processors:
    one or more non-transitory storage mediums storing program instructions, said one or more processor executing the program instructions;
    a plurality of electronic messages, comprising at least one of the non-transitory storage mediums, configured for offline consumption by designated recipients using at least one user-specified delivery condition;
    a communications system, comprising at least one of the one or more processors and comprising at least one of the one or more non-transitory storage mediums, configured to facilitate an exchange of the plurality of electronic messages between a plurality of computing devices over a communications network; and a restrictive presentation system, comprising at least one of the one or more processors and comprising at least one of the one or more non-transitory storage mediums, configured to restrict a presentation of the plurality of electronic messages upon a computing device of the designated recipients to a point in time when the computing device is in an offline state, wherein, when in said offline state, the computing device is disconnected from the communications network and only a view operation is allowed to be performed upon an electronic message, and, wherein the electronic message is automatically erased from the computing device once viewing is complete.

11. The system of claim 10, wherein the restrictive presentation system further comprises:

a server component configured to interact with the communications system and act as a centralized distribution point for the plurality of electronic messages; and a client application installed upon the plurality of computing devices of the designated recipients that is configured to act as an agent of the restrictive presentation system local to each computing device, wherein the client application requires the computing device to enter the offline state to access received electronic messages.

12. The system of claim 11, wherein the server component further comprises:

a secure data storage location for the plurality of electronic messages, wherein said secure data storage location is only accessible by the server component of the restrictive presentation system;

a delivery manager configured to securely deliver the plurality electronic messages to the client application operating upon the computing device of a designated recipient, wherein delivery occurs when said computing device is in an online state and accessible by the restrictive presentation system via the communications network; and a security handler configured perform a plurality of operations that provide security for the plurality of electronic messages, wherein said plurality of operations comprises at least a deletion of the electronic message once a delivery time limit is reached without one of a successful delivery of the electronic message to the computing device and a notification of offline consumption of the electronic message from the client application, and at least one of an encrypting of the plurality of electronic messages and an establishing of a secure communication channel with the computing device.

13. The system of claim 11, wherein the client application further comprises:

a device monitor configured to monitor a communications state of the computing device and values for environmental variables of the computing device for satisfaction of the at least one user-specified delivery condition of the plurality of electronic messages, wherein satisfaction of the at least one user-specified delivery condition indicates that the electronic message is ready for offline consumption, and, wherein the communications state comprises at least the offline state and an online state;

an auto-termination time limit that defines a maximum amount of time the electronic message is to be stored by the client application upon the computing device without being presented for offline consumption; and a presentation security mechanism configured to perform a plurality of functions that restrict handling of the plurality of electronic messages, wherein said plurality of functions comprises at least a deletion of the electronic message once the auto-termination time limit is reached without offline consumption, a decrypting of the plurality of electronic messages, when said plurality of electronic messages is encrypted, an appropriation of a space within a data store local to the computing device for storing the plurality of electronic messages, and a disabling of capabilities other than a view capability for a user interface used to display the plurality of electronic messages upon the computing device, wherein only the client application is able to access the appropriated space of the data store.

14. The system of claim 13, wherein the client application independently calculates the auto-termination time limit for each electronic message using at least a predefined formula and a set of rules, wherein calculation of the auto-termination time limit is influenced by the at least one user-specified delivery condition.

15. The system of claim 10, wherein the restrictive presentation system is a subsystem of the communications system, wherein the communications system is configured to convey electronic messages configured for offline consumption to the restrictive presentation system for handling.

16. A computer program product comprising a computer readable non-transitory storage medium having computer usable program code embodied therewith, the computer usable program code comprising:

computer usable program code configured to receive an electronic message configured for offline consumption upon a computing device, wherein said offline consumption is expressed as at least one user-specified delivery condition associated with the electronic message;

computer usable program code configured to determine an auto-termination time limit for the electronic message, wherein the auto-termination time limit defines a maximum amount of time the electronic message is to be stored upon the computing device without being presented for offline consumption;

computer usable program code configured to periodically assess satisfaction of the at least one user-specified delivery condition of the electronic message and the auto-termination time limit;

computer usable program code configured to, when the at least one user-specified delivery condition is satisfied prior to reaching the auto-termination time limit, ascertain a communications state of the computing device, wherein said communications state comprises at least an online state and an offline state, wherein the online state represents an ability of the computing device to exchange data over a communications network and the offline state represents an inability of the computing device to exchange data over the communications network;

computer usable program code configured to, when the communications state of the computing device is the offline state, present the electronic message within a user interface upon the computing device, wherein capabilities of the user interface and computing device are restricted to a view capability; and computer usable program code configured to, upon user-termination of the presentation of the electronic message, automatically delete the electronic message from a secured storage location local to the computing device.

17. The computer program product of claim 16, further comprising:

computer usable program code configured to, when the communications state of the computing device changes from the offline state to the online state, send notification of the offline consumption of the electronic message to a centralized management server.

18. The computer program product of claim 16, further comprising:

computer usable program code configured to, when the auto-termination time limit is reached prior to the presentation of the electronic message, automatically delete the electronic message from the secured storage location.

19. The computer program product of claim 16, further comprising:

computer usable program code configured to, when the communications state of the computing device is the online state, monitor the communications state of the computing device; and computer usable program code configured to detect a change in the communications state of the computing device to the offline state.

20. The computer program product of claim 19, wherein the change of the computing device from the online state to the offline state is achieved by at least one of a virtual block of communication ports of the computing device and a physical disconnection of the computing device from the communications network.

* * * * *